March 4, 1958
R. C. STUTZ
2,825,680
APPARATUS FOR CONCENTRATING AQUEOUS SOLUTIONS
OF HYGROSCOPIC ORGANIC SUBSTANCES
Filed March 31, 1953
2 Sheets-Sheet 1
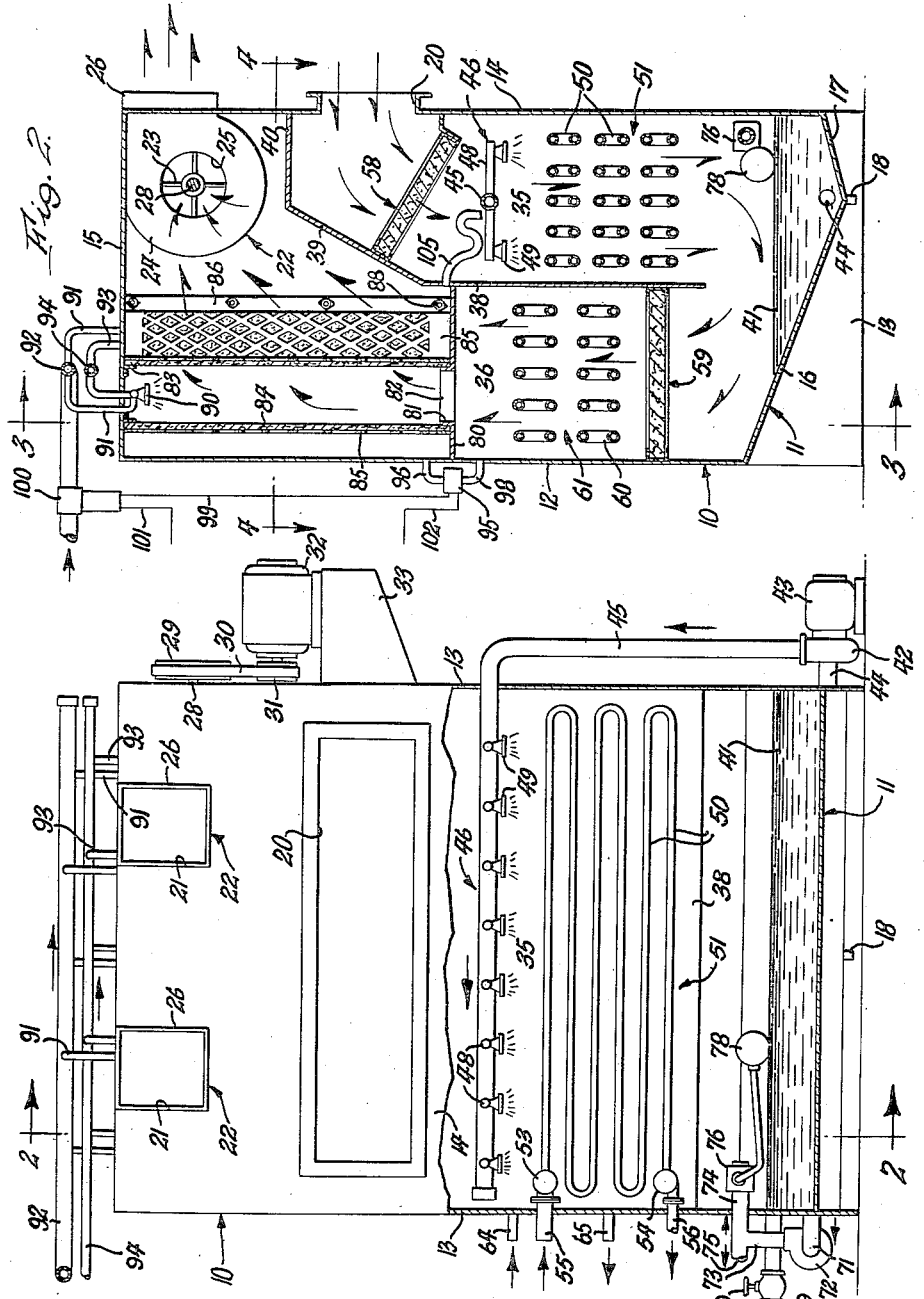
INVENTOR.
Robert C. Stutz
BY
Popps and Sommer
ATTORNEYS.

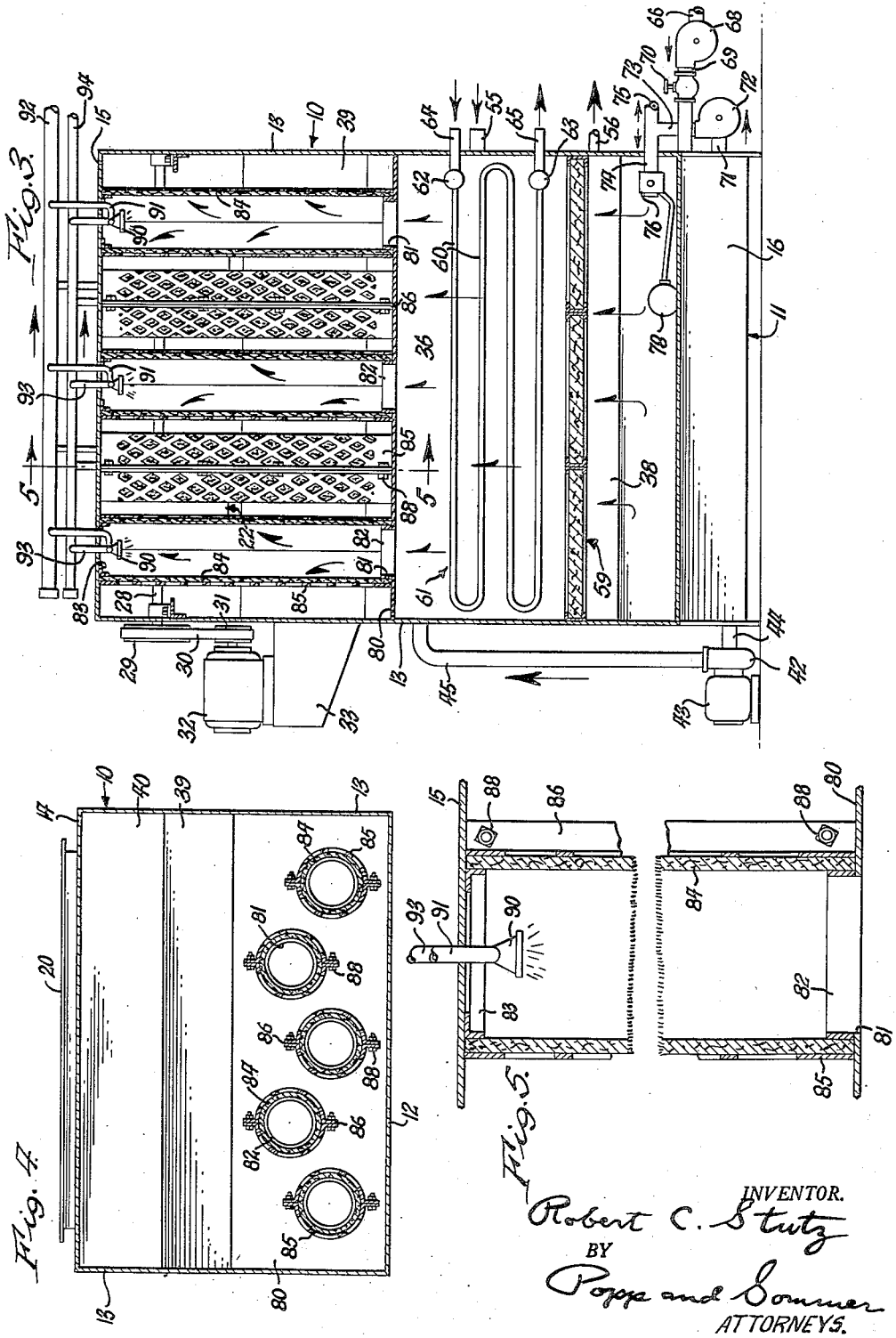

ZjSZ5,680

Patented Mar. 4, 1958

2,825,680

APPARATUS FOR CONCENTRATING AQUEOUS SOLUTIONS OF HYGROSCOPIC ORGANIC SUBSTANCES

Robert C. Stutz, Buffalo, N. Y., assignor to Niagara Blower Company, New York, N. Y., a corporation of New York Application March 31, 1953, Serial No. 345,948

13 Claims. (Cl. 202—209)

This invention relates to a method and apparatus for concentrating aqueous solutions of hygroscopic organic substances having boiling points higher than the normal boiling point of water, and more particularly organic substances such as the polyhydroxy organic compounds, and including glycerol and the polyglycerols typified by triethylene glycol, used to dehumidify air as described in the Spiselman Patent 2,367,695. The invention is particularly applicable in concentrating solutions to have a concentration of 85% or higher of the hygroscopic organic substance.

This application is a continuation in part of my copending application, Serial No. 241,999, filed August 15, 1951, for Method and Apparatus for Concentrating Aqueous Solutions of Organic Hygroscopic Substances.

As set forth in the said Spiselman patent, very efficient concentration of such hygroscopic organic substances can be effected by passing a current of carrier gas, such as air, over an extended surface of the solution to be concentrated while heating this solution from a temperature above the initial dewpoint temperature of the current of gas to, say, 160° F. Within this range of temperatures the ratio of the amount of water evaporated to the amount of hygroscopic organic substance evaporated is at a maximum, the preferred temperature of evaporation within this range varying with the concentration of the hygroscopic organic substance in the solution and the moisture content of the carrier gas available for use in the process. The lower the concentration to be effected, the lower the temperature to which the solution is advantageously heated, the high temperature of 160° F. being used to concentrate solutions from about 94% to 96% concentration of the hygroscopic organic substance. Utilizing atmospheric air of the moisture content normally obtained in the summertime, for the concentration of such organic solutions the temperature to which the solutions are heated in the concentration operation are advantageously from 100° to 160° F.

Passing such current of carrier gas over an extended surface of the aqueous solutions of such hygroscopic organic substance transfers by evaporation to the current of gas mixed vapors of water and the organic substance. When the extended surface of the solution is provided by sprays, particularly against a heated surface, there is also transferred to the current of carrier gas minute particles of the solution which are carried away by the current of gas as entrained liquid. These minute particles appear to be in part generated by the physical act of spraying the solution into the carrier gas but in greater part by contact with the heated surface which is necessarily at a higher temperature than the desired maintained temperature of this solution. Thus to heat a, say, 94% solution to 160° F. the temperature of the heating surface would be in the order of 250° F. and this temperature is above the boiling point of the 94% solution. The solution therefore boils on striking the heated surface, but boils off in substantial part not as a true vapor but as a fog of very minute particles of the solution. While the amount of hygroscopic substance so carried away from the sprays in vapor and liquid form is very small as compared with the water vapor, the hygroscopic organic substance is costly and loss of the substance so carried away would be commercially uneconomical.

As also outlined in said Spiselman patent, the greater part of the hygroscopic organic substance carried away as vapor can be recovered by saturating the carrier gas leaving the sprays with water. Such saturation drives the hygroscopic organic component of the vapor into liquid phase. Such saturation can be obtained by passing the carrier gas leaving the concentrating sprays in contact with an extended surface of water but more advantageously such saturation can be obtained by cooling the carrier gas close to its dewpoint temperature. With the use of a reflux coil to so bring the carrier gas close to its point of saturation, it is undesirable that its temperature be so low as to act as a reflux condenser. The essential purpose of such a reflux coil is to saturate the air and drive the hygroscopic organic substance which has a very low vapor pressure out of vapor phase. The hygroscopic organic substance appears to be driven out again in the form of very minute particles. Further the minute particles of the solution generated by the concentrating sprays and boiling on the heated surface in large part travel past the wetted surface of the reflux coil because of the difference in the vapor pressures between the constituents of the minute particles and the constituents of the air.

Also since the carrier gas is not cooled below its dewpoint by the reflux coil there still remains in the carrier gas a small amount of the hygroscopic organic substance in vapor form.

The recovery of the hygroscopic organic substance by the reflux coil could be increased by reducing its temperature well below the dewpoint of the carrier gas so that the reflux coil would act as a condenser. Such increased recovery would be both from the vapor and also to a lesser extent appears to be from the minute particles of entrained solution. However if the temperature of the reflux coil were reduced to such low value as to reduce the loss of the hygroscopic substance to a commercially economic level, the reflux condenser would condense so much water as to reduce the capacity of the apparatus below an acceptable level. The fundamental object of the apparatus, is of course, to remove water from the solution being treated and all water returned by the cooling coil directly reduces the capacity of the apparatus.

The present invention is of particular advantage in concentrating solutions having a very high concentration of the hygroscopic organic substance, such as concentrations in excess of 85% and preferably from 94 to 96% of the substance. At such concentrations the minute particles of solution generated by the concentrating sprays and by boiling on the heated surface and carried off as entrained liquid are also, of course, of this high concentration. It also appears that the minute particles of solution generated on passing the reflux coil are of a substantial concentration. Since these particles are not removed by the reflux coil, unless recovered they represent a substantial loss of the substance.

It is accordingly the principal object of the invention to provide a method and apparatus for reducing the loss of the hygroscopic organic component of an aqueous solution being concentrated by spraying the solution into a carrier gas, particularly when sprayed against a heated surface, and where minute particles of the solution are carried away from the concentrating sprays and heated surface by the carrier gas.

It is a further object to provide such a method and apparatus which is particularly adaptable to the concentration of such solutions where the concentration of the hygroscopic organic substance must be maintained at values of 85% or higher.

Another object is to effect recovery of substantially all of the hygroscopic organic substance, both as vapor and as entrained minute particles, without resorting to such low values of reflux cooling as would condense substantial amounts of water and render the method and apparatus commercially uneconomical.

Another object is to provide such a method and apparatus which preferably involves the use of water following reflux cooling and which water is added to the solution being concentrated but which water is in such small quantity as not to materially reduce the capacity of the apparatus.

Another object is to provide such a method and apparatus which is inexpensive to operate, particularly in the use of heating and cooling media and water.

Another object is to provide such apparatus which is simple, compact and inexpensive.

Another object is to provide such apparatus which has low impedance or resistance to the flow of the carrier gas so that low pressure blowers can be used to propel the carrier gas.

Another object is to provide such a method and apparatus which in addition to being economical in operation has a uniformly high capacity and is positive in its operation so as to avoid the necessity for constant attention.

Another object is to provide such a method and apparatus in which the temperatures and amount of water used is not particularly critical and can readily be automatically controlled.

Another object of the invention is to provide a simple and positive feed of dilute solution to the apparatus and discharge of the concentrated solution from the apparatus.

Other objects and advantages of the invention will be apparent from the following description and drawings in which:

Fig. 1 is a side elevational view of apparatus embodying the present invention.

Fig. 2 is a vertical transverse sectional view taken generally on line 2—2, Fig. 1.

Fig. 3 is a vertical longitudinal section taken generally on line 3—3, Fig. 2.

Fig. 4 is a horizontal sectional view taken generally on line 4—4, Fig. 2.

Fig. 5 is a fragmentary enlarged vertical section taken generally on line 5—5, Fig. 3.

In the accompanying drawings the numeral 10 represents a sheet metal casing composed of a generally rectangular bottom 11, a rear wall 12, counterpart side walls 13, a front wall 14 and a top wall 15. The bottom 11 is shown as comprising a relatively large rectangular rear panel 16 and a relatively small rectangular front panel 17, these panels being arranged at an angle to each other and providing a V-shaped trough having a closable drain 18 at its bottom. The front wall 14 is provided with a fresh air inlet duct 20 which is preferably of rectangular outline and is arranged immediately above the center of the front wall 14. Above the air inlet 20 and close to the top wall 15 the front wall 14 is provided with a pair of rectangular openings 21.

The casing houses a pair of blowers, indicated generally at 22, each of these blowers having a fan wheel 23 and surrounding scroll 24 which also has air inlets 25 and a rectangular outlet neck 26, these outlet necks 26 being fitted in and projecting through the corresponding upper opening 21 of the front wall 14 of the apparatus. The fan wheels 23 are mounted on a common fan shaft 28 which fan shaft is journalled in suitable bearings carried by the casing and projects outwardly from one end of the casing as best shown in Fig. 1. A pulley 29 is shown as secured to the projecting end of the fan shaft 28 and this pulley is shown as connected by a drive belt 30 with the pulley 31 on the shaft of an electric motor 32. This motor is shown as mounted on a supporting bracket 33 which is in turn secured to the corresponding end wall 13 of the casing.

The interior of the casing is divided into a downflow pass 35 and an upflow pass 36 by a vertical central partition 38 secured at its ends to the end walls 13 and arranged parallel with the front and rear walls 14, 12 of the casing. The upper end of the partition 38, generally in line with the lower end of the air inlet 20, inclines toward the pair of air outlet openings 21, as indicated at 39, and the upper end of this angular upper extension 39 of the partition 38 extends horizontally to the front wall 14, as indicated at 40. This horizontal section 40 of the partition 48 is arranged intermediate the blowers 22 and the air inlet 20, as best shown in Fig. 2.

The bottom of the casing forms a sump containing a body 41 of the liquid to be treated. This liquid is recirculated by a recirculating pump 42 driven by an electric motor 43 and having its inlet 44 extending through a corresponding end wall 13 of the casing and submerged in the body 41 of liquid in the bottom of the casing. The outlet line 45 from the recirculating pump 42 extends vertically upwardly from the pump 42 and thence in a horizontal direction through the corresponding end wall 13 of the casing at the center of the downflow pass 35 immediately below the air inlet 20. The horizontal portion of the outlet pipe 45 provides the main pipe of a spray tree 46. This spray tree is formed by a suitable number of horizontal branches 48 each carrying a spray nozzle 49 and which are preferably arranged, as shown, to discharge downwardly.

These sprays discharge against the tubes 50 of a heating coil indicated generally at 51 so as to impinge against the exterior of these tubes and be heated thereby. Each of the tubes 50 is shown as being of serpentine form and as connected at its upper end with a steam header 53 and at its lower end with an outlet header 54. Steam is shown as supplied to the upper steam or inlet header through a steam inlet line 55 and the condensate is shown as withdrawn from the lower outlet header 54 by a condensate outlet pipe 56.

The entering fresh air first passes through an air filter 58. This filter is shown as being in the form of a conventional mat or body of glass fibers contained within a metal casing arranged across the upper end of the downflow pass 35 between the spray tree 46 and the air inlet 20. A similar filter, indicated generally at 59, is shown as disposed across the lower end of the upflow pass 36 between the body 41 of liquid and the coils 60 of a reflux or cooling coil indicated generally at 61. The reflux or cooling coil 61 is arranged in the upflow pass 36 immediately above the air filter 59 and its tubes 60 are shown as being of serpentine form each being connected at its upper end to an inlet header 62 and at its lower end to an outlet header 63. The inlet header 62 is shown as provided with an inlet 64 for the coolant and the outlet header 63 is shown as provided with a coolant outlet line 65 which is shown as connected through the inlet and wall 13 of the casing.

A feature of the invention resides in the apparatus for supplying dilute solution to the concentrator and removing concentrated solution therefrom. The dilute solution would come from the apparatus being served (not shown) and is withdrawn from this apparatus being served through a pipe 66 by a pump 68 to a line 69 extending through one of the end walls 13 and delivering the dilute solution to the body 41 of solution in the bottom of the casing. The discharge from this pump 68 is under control of a hand valve 70 and which can be set to approximately the flow desired under operating conditions. The outlet line 71 from the body of liquid 41 in the bottom of the casing leads to the inlet of a pump 72 the outlet line 73 of which is branched, one branch 74 returning to the casing and the other branch 75 returning the concentrated liquid to the apparatus being served.

The bypass branch 74 is under control of a float valve 76 the float 78 of which is responsive to the level of the body 41 of solution in the bottom of the casing. The pump 72 has a greater capacity than the pump 68 and hence this pump tends to lower the level of the body 41 of solution in the casing. When this occurs the float 78 lowers to open the float valve 76 and hence a proportionate amount of the discharge from the pump 72 will be bypassed through the branch 74 back into the body 41 of solution so as to maintain the desired level thereof. It has been found that this combination provides a very simple and effective control for exchanging dilute solution from the apparatus being served with concentrated solution and at the same time maintaining a constant level in the body 41 of solution so as to insure the proper operation of the concentrator forming the subject of the present invention.

An important feature of the present invention resides in the recovery of substantially all of the higher boiling point component from the vapors passing the cooling or reflux coil 61. To this end a horizontal partition 80 is provided across the upflow pass 36 immediately above the reflux coil 61. This partition is provided with a number of openings 81 each surrounded by an upstanding neck 82. As best shown in Fig. 4 these openings can be staggered and are preferably round.

As best shown in Fig. 5, in vertical register with each of the upstanding necks 82 is a depending neck 83 which is secured to the underside of the top 15 of the casing and is round and of the same diameter as the companion upstanding neck 82. Each companion pair of necks 82, 83 is embraced by a cylindrical wall 84 of matted glass hair-like fibers, the lower end of each cylindrical wall or cylinder resting on the partition 80 and the upper end extending to the top 15 of the casing. Each cylinder 84 of matted glass fibers is encased in a foraminous metal cylinder, preferably made of expanded sheet metal. Each of these foraminous metal cylinders 85 is preferably made in the form of two semi-cylindrical sections, each section having a pair of opposite longitudinal flanges 86 so that when the two sections of each cylinder are assembled these flanges 86 are arranged in face-to-face relation. These flanges can be bolted together by a series of bolts 88 and which draw the foraminous metal sections into firmly embracing relation with the matted glass fiber cylinders 85 and also draw the upper and lower ends of these matted glass fiber cylinders 85 into firmly clamped relation with the necks 83, 82, respectively. It will be seen that the air passing through the apparatus must pass through the matted fiber glass cylinders 84.

An important feature of the invention resides in the continuous wetting of each of these matted glass fiber cylinders 85. For this purpose a downwardly directed fogging nozzle 90 is arranged in the upper end of each of these cylinders and is supplied with water through a branch line 91 which extends through the top 15 of the casing and connects with a main water line 92. It is important that this water be supplied in a small amount and as a finely atomized spray or fog. To this end each fogging nozzle 90 is also supplied with compressed air to be discharged with and atomize the water into a fog issuing from each nozzle 90. For this purpose each nozzle 90 is supplied with compressed air from a branch line 93 which extends through the top 15 of the casing and connects with a main compressed air line 94.

To discharge as a fog only that amount of water from the fogging nozzles 90 as is necessary to effect separation of substantially all of the hygroscopic organic substance from the vapors leaving the reflux coils 61, a control is provided for automatically regulating this amount of water. For this purpose a diaphragm switch 95 is provided, one side of the diaphragm of this switch being in communication with the upflow pass 36 above the partition 80 through a pipe 96 and the other side of the diaphragm of this switch being in communication with the upflow pass 36 below the partition 80 through a pipe 98. Accordingly the diaphragm switch 95 is responsive to the differential in air pressures in the upflow pass 36 above and below the partition 80 and hence on opposite sides of the matted glass fiber cylinders 84. On line 99 from the diaphragm switch 95 connects with a solenoid valve 100 in the water supply line 92, the other sides of the diaphragm switch 95 and diaphragm valve 100 being connected to the opposite sides 101 and 102 of a main power line.

To return the solution filtered out by the cylindrical matted glass fiber cylindrical walls 84, a U-tube 105 is provided, the upper end of which extends through the vertical partition 38 to drain the upper side of the horizontal partition 40 and the lower end of which discharges into the downflow pass 35 immediately above the spray tree 46.

*Operation*

The apparatus as above described is primarily directed to the economical concentration of aqueous solutions of hygroscopic organic substances, such as the higher alcohols, and which substances have boiling points higher than the normal boiling point of water, the primary object being to effect such concentration economically without substantial loss of the substance and without undue supervision of the apparatus or its operation. The concentration of the hygroscopic organic substance can be high, such as above 94% when the solution is used as a hygroscopic solution for dehumidifying air, or it can be very considerably lower when the organic substance is used merely as an anti-freeze medium in spray coolers, where air is passed through a spray chamber and over refrigerated coils which are prevented from icing up by a recirculation of the solution through sprays directed against these coils and into the air stream. The invention is particularly useful, however, where the concentration to be maintained is above 85% of the hygroscopic organic substance since for these higher concentrations it is desirable to heat the solution to a temperature at which the generation of minute particles of the solution entrained in the carrier gas is promoted.

In either use, the solution of the hygroscopic organic substance becomes dilute through absorption of water and must be reconcentrated in order to preserve its hygroscopic or anti-freeze properties. This dilute solution is withdrawn from the apparatus being served through the pump inlet line 66 by the pump 68 and is discharged through the pump outlet line 69 into the body 41 of solution in the bottom of the casing. The flow of the dilute solution to be reconcentrated is under control of the manual valve 70 and which is adjusted to provide the approximate rate of flow necessary to effect continuous reconcentration of the solution under the particular conditions encountered. If desired the incoming cool solution can be passed in heat exchange relation with the outgoing solution or preheated in any other manner, such heat exchange forming no part of the present invention and hence not being shown.

The body 41 of liquid in the bottom or sump of the casing 10 is continuously being recirculated through the spray tree 46 and at the same time is heated by contact with the heating coil 51. Thus the electric motor driven pump 42 withdraws solution from the body 41 through its inlet 44 and discharges this liquid through its outlet pipe 45 and nozzles 47 of the spray tree 46 downwardly in the downflow pass 35 and against the serpentine tubes 50 of the heating coil 51. The solution so sprayed against the heating coil 51 impinges against the tubes of this heating coil and hence is heated before returning to the body 41 in the bottom of the casing so that the temperature of the solution being recirculated as above described is maintained at a temperature determined by the temperature of the heating coil 51.

It is at this point that generation of the greatest part of the minute particles of the solution takes place, these particles entering the air stream as entrained liquid and forming the principal problem relating to loss of solution when the air stream is discharged back into the atmosphere. These particles are generated as a function of the sprays and also because of the solution boiling on the tubes of the heating coil 51. In so boiling a substantial part of the solution is driven off not as a true vapor but in the form of these minute particles of solution.

A stream of fresh or atmospheric air is brought into contact with the heated sprays issuing from the nozzles 49. This fresh or atmospheric air enters through the air inlet 20 and passes through the air filter 58. This air then passes down the downflow pass 35 coming in contact with the heated solution being sprayed from the nozzles 49. This air then passes under the central partition 38 and flows up the upflow pass 36 through the air filter 59. This air then passes the serpentine coils 60 of the reflux coil 61, and passes through the openings 81 through the horizontal partition 80 into the interior of the several vertically arranged tubes 84 of matted hair-like glass fiber. The air passes through the fine interstices of these matted glass fiber cylinders and escapes to the exterior thereof and is drawn into the inlets 25 of the discharge fans or blowers 22, these blowers providing the above described propulsion of the air and discharging the air back to the atmosphere.

An important feature of the invention resides in the continuous wetting of the interior of each of the vertical tubes 84 of matted glass with water, although a dilute solution of the hygroscopic material being concentrated could be used. This water is supplied from the water supply pipe 92 through the branches 91 to the fogging nozzles 90 severally discharging downwardly into the interior of the several matted glass fiber tubes 84. It is important that this water be provided as a fog so as to be carried in contact with the inner surfaces of the vertical cylinders 84 of matted glass fiber and also to pick up the minute particles of solution entrained in the air stream. To this end compressed air is also supplied from a line 94 to the several fogging nozzles 90 so as to break up or atomize the sprays into a very fine fog.

It is also important that the water so sprayed from the fogging nozzles 90 be supplied in a minimum amount since it flows down the matted glass cylinders 84 to the horizontal partition 80 from which it drains back through the U-tube 105 into the body 41 of liquid in the bottom of the casing 10. Accordingly this water operates to dilute the liquid being concentrated and if supplied in an excess amount would seriously diminish the capacity of the concentrator. While it is entirely practicable to manually adjust the supply of water to the fogging nozzles 90, an arrangement is also shown for automatically controlling the water supply in response to the pressure drop across the several matted glass fiber cylinders 84. As the supply of water to the fogging nozzles 90 increases so that a greater quantity of water impinges against the matter glass cylinders 84 the resistance to the air flow through these cylinders, of course, increases and hence the resistance of these matted glass cylinders to air flow also increases so as to provide a greater pressure drop or pressure differential across these matted glass fiber cylinders. This differential exists in the pipes 96 and 98 connecting with the interior of the casing on opposite sides of the partition 80 and this differential serves to actuate the diaphragm of the diaphragm switch 95 in response to this differential. When the pressure drop or differential becomes excessive, the diaphragm switch 95 moves the solenoid valve 100 toward closed position so as to cut down the flow of water from the main 92 to the several fogging nozzles 90. Conversely when insufficient water is received by the vertical matted glass fiber cylinders 84 to permit of their efficient operation the pressure differential on opposite sides thereof decreases so as to actuate the diaphragm switch 95 to open the solenoid valve 100 and increase the supply of water from the main 92 to the several fogging nozzles 90.

The concentrated liquid is withdrawn from the body 41 in the bottom of the casing 10 by the return pump 72 through the inlet 71 to the pump. This liquid is returned to the apparatus being served through the pump outlet 73 and its branch 75. The return pump 72 has a slightly greater capacity than the supply pump 68 and accordingly tends to lower the level of the body of liquid 41. As this occurs the float 78 drops so as to open the float valve 76. Accordingly a part of the discharge from the return pump 72 flows back through the branch 74 and partly open float valve 76 to the body 41 so as to maintain the level of this body 41 constant.

With the above described movements of fresh or atmospheric air, solution of hygroscopic organic substance and water their functioning in concentrating the solution with a minimum loss of the hygroscopic organic substance is as follows:

The solution of the hygroscopic organic substance discharged from the concentrating or spray nozzles 49, heated by repeated contact with the tubes 50 of the heating coil 51, transfers into the stream of fresh air moving down the downflow pass 35 mixed vapors of water and the hygroscopic organic substance, but principally water vapor, so that the excess solution discharged from these concentrating nozzles 49 and returning to the body 41 of solution in the bottom of the casing 10 is more concentrated with respect to the hygroscopic organic substance. This heated spray water, as well as the tubes 50 of the heating coil 51, also heats the passing air stream thereby to permit it to absorb a greater quantity of water vapor. It will therefore be seen that the sprays from the concentrating nozzles 49 operate both to effect an initial concentration of the solution and a separation of this concentrated solution from the air stream, this separation being effected by the return of the unevaporated portion of the spray liquid to the body 41 of solution in the bottom or sump of the casing 10. It has been found that such recirculation of the solution to be concentrated through the sprays of the concentrating nozzles 49 provides the necessary large area of contact between the solution and the stream of gas or fresh air without resorting to packings of ceramic shapes or a system of baffles for this purpose.

However, along with the generation of the mixed vapors of water and the hygroscopic organic substance, there are also generated minute particles of the solution which enter the air stream as entrained liquid and have proved extremely difficult to recover. This minute particles are generated in part by the physical act of spraying the solution into the air stream and also by boiling of the solution on the tubes 50 of the heating coil 51. Since at higher concentrations higher heating coil temperatures are employed, the generation of these minute particles increases with the treatment of higher concentration solutions. This generation of these minute particles appears to be due to flashing of a part of the solution striking the tubes 50 into these minute particles instead of entirely into a true vapor.

The stream of air so containing mixed vapors of the water and hygroscopic substance, but principally of water vapor, and also carrying these entrained minute particles of solution, then passes through the air filter 59. This filter serves to remove the larger drops of entrained solution from the air stream, which entrained solution caught by the air filter 59 flows back to the body 41 of solution in the bottom or sump of the casing 10. However, due to their minute size as well as the difference in vapor pressures between the constituents of the minute particles and the constituents of the air, the minute particles of solution generated by spraying against the heated coils 51 in large part at least go right past the wetted surfaces of the filter 59 into the upflow pass 36.

The heated air, with mixed vapors of water and the hygroscopic substance, as well as these minute entrained particles of solution, then passes upwardly through the upflow pass 36 in contact with the tubes 60 of the cooling or reflux coil 61. The temperature of this cooling coil or reflux condenser is maintained at such value as to cool the hot vapor-laden air close to but preferably not below its dewpoint temperature in consequence of which the hot vapor-laden air is cooled to approximately its dewpoint so as to substantially saturate the vapor-laden air with water and to drive substantially all of the vapor of hygroscopic organic substance in the vapor-laden air into its liquid phase. The minute particles of solution generated by the concentrating sprays go past the wetted surfaces of the coils 60 of the reflux cooling coil 61 without apparent change or significant diminution. Also a substantial part of the hygroscopic organic substance so driven into its liquid phase by the reflux cooler 61 appears to be driven out in the form of minute particles of solution which join the minute particles generated by the concentrating sprays spraying against the heating coils 51. The greater part of the condensate from the reflux coil, containing a substantial percentage of the hygroscopic organic substance, flows back through the air filter 59 back to the body 41 of solution in the bottom or sump of the casing 10.

It is important that the surface temperature of the reflux cooling coil 61 be maintained at such value that the temperature of the air stream be not lowered substantially below the dewpoint of the hot vapor-laden air reaching the reflux condenser. In other words the reflux coil 61 must act essentially as a saturator and not as a condenser. If the temperature of the reflux coil is maintained substantially below the dewpoint temperature of the stream of air, while its action in preventing loss of the hygroscopic organic substance is greatly increased there also occurs a condensation of an excessive amount of water vapor which flows back to the body 41 of solution in the bottom of the tank. Since the fundamental objective is to generate and get rid of water vapor, it will be seen that the reflux condensation of water vapor works against the fundamental objective and, if excessive, reduces the capacity and efficiency of the apparatus to an uneconomical value.

The air leaving the reflux cooling coil 61 therefore still contains a substantial amount of the hygroscopic organic substance in the form of very minute particles of the solution of the substance and it is the principal feature of the present invention to catch these very minute particles and to return them to the body of solution 41 before the air reaches the discharge blowers 22.

A part of these minute particles of the solution is physically caught by the myriad of hair-like fibers and interstices of the matted glass fiber vertical walls or cylinders 84 through which the air carrying the minute particles of solution must pass to reach the discharge fans or blowers 22. In this physical entrapment of these very fine particles of entrained liquid, a most important feature of the invention is that the vapor must pass through the matted glass fiber walls 84 at a low velocity. This relatively low velocity is essential to give the hair-like fibers of the walls 84 an opportunity to catch and hold the minute particles, it having been found that at higher velocities these particles are swept through the glass fiber walls, even when wetted, without being caught by the fibers. Also drops of larger size than the minute particles entrained in the vapor reaching the glass fiber walls 84 collect on the fibers of these glass walls, particularly at the leaving face thereof. At higher velocities of vapor through the glass fiber walls 84, these drops are swept off of the fibers at the leaving face to these walls and back into the air stream thereby to nullify the separating action of these walls to this extent. It has been found that a face velocity in the order of 60 feet per minute is best suited both to insure entrapment of the minute liquid particles by the fibers of the matted glass fiber walls 84 and also to avoid formed drops being swept off the leaving face of these walls.

However, these matted glass fiber walls 84 are not alone sufficient to catch an adequate quantity of the minute particles of solution and hence by themselves would permit the escape and loss of too great a quantity of the hygroscopic organic substance, even when wetted by the collected solution. To avoid this condition, the air containing the fine particles of solution encounter the water fog issuing from the fogging nozzles 90. As previously noted, instead of water a dilute solution of the hygroscopic organic substance could be supplied to the fogging nozzles as well as water condensate, as from the heating coil 51, but it is preferred to use cool fresh water. This water fog issuing from the fogging nozzles is carried by the hot vapor-laden air with its minute particles of solution of the hygroscopic organic substance into contact with the vertical inside faces of the several matted glass fiber walls or cylinders 84. It is believed that on initial contact with the fog from the fogging nozzles 90 a substantial part of the minute particles of solution in the vapor-laden gas combine with the larger water droplets of the fog and hence provide larger solution-containing droplets which are more easily caught by the matted glass fiber walls 84. More important, however, is that the mist wets the matted glass fiber walls and greatly increases its effectiveness in catching substantially all of the minute particles of the solution carried to it by the vapor-laden air. The water from the mist of the fogging nozzles 90 is carried to the entering or inner faces of the vertical matted glass fiber walls 84 and through the force of the vapor-laden gas passing horizontally through these walls is moved horizontally toward the leaving or outer faces of these walls. At the same time the force of gravity causes a downward movement of the water internally of these walls. As the minute particles of solution are caught by the matted glass fiber walls 84, the water from the fogging nozzles becomes a weak aqueous solution of the hygroscopic organic substance and there is a gradient in the strength of the solution both horizontally and vertically through each glass fiber wall 84. These gradients are such that there is an increase in solution strength of 2 or 3% horizontally from the entering to the leaving faces of these walls, and also an increase in solution strength from the top to the bottom of these walls. This vertical gradient is from 0% at the top of each wall to from 6 to 8% at the bottom thereof.

There is also a vertical gradient of wetness of these matted glass fiber walls 84. Thus these are least wet at top and approach saturation at their bottoms. The flow of the air stream through the walls 84 is related to their degree of wetness, there being substantially no flow through these matted glass fiber walls when saturated with liquid and an increasing flow as the wall approaches dryness. Accordingly there is a gradient in the volume of air passing through the matted glass fiber walls 84, the largest air flow being through the tops of these walls and progressively decreasing toward the bottoms of these walls. Since the gradient in solution strength increases toward the bottoms of these walls whereas the amount of air flow decreases toward the bottoms of these walls, it will be seen that the greater part of the air contacts the weaker solution in the walls, this being of advantage since a weaker solution combines more avidly with the air borne hygroscopic organic substance.

Another factor involved is that the temperature of these walls 84 is substantially lower than the temperature of the vapor-laden gas leaving the reflux coils 61, this being due to the use of cool water supplied to the fogging nozzles 90; the expansion of the compressed air supplied to these fogging nozzles; and to the evaporative cooling effect of the compressed air so supplied in combination with the water so supplied.

Another important feature of the invention is that the matted glass fiber walls 84 have a large face area and slight thickness in the direction of air travel. The large face area is essential to obtain adequate capacity since with the low face velocity of 60 feet per minute preferred, the face area of the walls 84 must be large to handle an adequate volume of air. Also it is important that the matted glass fiber walls 84 be thin in the direction of vapor movement because otherwise the resistance or impedance to air flow would be so great as to provide an excessive pressure drop across these walls and which would require excessively powerful blowers 22 to draw the air through the walls as well as to increase the likelihood of drops being swept off the leaving face of the matted glass fiber walls 84 at the top areas thereof which offer less resistance to air flow due to their being wetted to a lesser degree.

This wetting of the matted glass fiber walls must also be controlled although this factor is not highly critical. If too little water is supplied by the fogging nozzles 90, the recovery of the organic hygroscopic material is greatly reduced both because fewer of the minute particles of the hygroscopic substance couple with the larger droplets of the water from the fogging nozzles while both are in suspension in the air and also because the fibers of the matted glass fiber walls 84 are not wetted to the extent necessary to avidly seize and hold any hygroscopic particles brought in contact therewith. Also, of course, all the water discharged by the fogging nozzles 90 acts to nullify the fundamental objective of the concentrator to remove water from the liquid being treated and hence excessive spray water from the fogging nozzles is highly undesirable.

It is believed that the high degree of effectiveness of the water sprayed matted glass fiber walls 84 is the result of a number of distinct processes which act in combination.

The concentrating spray nozzles 49 which spray the liquid to be concentrated into the downwardly flowing air stream in the downflow pass 35 and against the heating coil 51 evaporate principally water into the air stream but also evaporate such amount of the organic hygroscopic substance as would be impracticable to lose. Further, these sprays project minute particles of liquid containing a high concentration of the organic hygroscopic substance into the air stream and which, if not recovered, would also result in an impracticable loss. These minute particles are augmented by similar particles generated by flashing on the tubes 50 of the heating coil 51.

While larger bodies of entrained liquid are removed from the air stream on reversal in direction from the downflow pass 35 to the upflow pass 36 and also in passing through the filter 59, the air stream flowing through the upflow pass still contains an uneconomical quantity of these entrained minute particles containing the hygroscopic organic substance.

The reflux cooling coil 61 cools the air flowing up the upflow pass 36 to approximately its dewpoint. This saturates the air and drives substantially all of the organic hygroscopic substance into liquid form but does not remove all of the minute particles of organic substance from the air. It appears, in fact, that further minute particles are generated by the reflux coil in those portions of the air stream which are cooled but do not actually contact the air stream. It appears possible to remove an economical amount of the organic hygroscopic substance by reflux condensation at a temperature substantially below the dewpoint of the passing air, but only at a sacrifice of condensing an excessive amount of water back into the solution being concentrated.

The air stream containing the minute particles of organic substance then enter the cylinders 84 of matted glass fibers. Here the particles encounter the mist of water issuing from the fogging nozzles 90. The water particles are much larger than minute particles containing the organic substance and are cooler. Those minute particles from the upflowing air stream which encounter the particles of water couple with the latter to form much larger droplets although of weaker solution, of course. The water vapor also tends to reduce the temperature of the air stream and drive further vaporized organic substance into liquid form, joining the larger droplets of water. These droplets of water, some containing the organic hygroscopic substance, then enter the matted glass fiber walls 84. The irregular hair-like fibers of these walls cause, in a short space of travel, an extremely erratic movement of and slowing down of the vapor, and also of the minute particles of entrained solution of the organic hygroscopic substance and the larger water droplets some of which contain the substance. The rapidly changing direction of movement of the vapor brings substantially all of both the water droplets and the minute particles of solution of organic substance into contact with the wetted fibers of the walls and since these walls are constantly being wetted with a fresh supply of water, the water, in weak solution especially toward the entering faces of the walls 84 and toward the tops of these walls, avidly combines with the organic hygroscopic substance of both the fine particles of hygroscopic solution and also that contained in the vapor.

This ability of the wetted walls 84 to extract the organic hygroscopic solution from the passing air with its entrained minute particles of organic hygroscopic solution is augmented by the fact that both the wetted walls 84 are cooler than the vapor presented to it and also to the fact that unsaturated air is added to the saturated air entering the cylinders 84. The cooler condition of these walls is due to the fact that cool water is supplied to the fogging nozzles 90, that compressed air is supplied to these fogging nozzles to project the water as a fog and the expansion of which absorbs heat; and that some evaporative cooling takes place between the compressed air and the fog created by this compressed air. This cooler condition of the wetted matted glass fiber walls increases the rate of transfer of the organic substance to the walls.

The admission of compressed air used for the fogging nozzles 90 also converts the saturated air leaving the reflux coil 61 to an unsaturated state so that evaporation of the water from the wetted matted glass fiber walls 84 takes place with consequent enrichment of the hygroscopic organic substance content of the water in the solution adhered to the fibers of these walls. The exchange is probably complicated with both evaporation and recondensation taking place throughout the horizontal thickness of these walls, the evaporation being essentially of the water content and the condensation being essentially of the hygroscopic organic substance.

The fact of there being a gradient of wetness of each matted glass fiber wall 84 with the wetness approaching saturation toward the bottom; a consequent gradient of air flow with more air through the wall toward the top thereof; and a gradient of concentration of the solution adhered to the fibers of the wall with the concentration increasing toward the bottom of the wall are also of importance. As a result a relatively large amount of air passes in contact with a weaker solution, such weaker solution having greater avidity in abstracting the hygroscopic substance, both as vapor and as minute particles, from the air. In this connection the movement of the incoming air parallel with the walls 84 from the lower end thereof with the fogging nozzles 90 at the upper ends thereof is also important in maintaining this condition of gradients.

Also, as indicated, due to the low face velocity against the matted glass fiber walls created by the blowers 22, there is no tendency for the passing air to carry off droplets clinging to the fibers at the leaving faces of these walls. These are of relatively high concentration and would represent a substantial loss if they reentered the air stream.

As a result of these combined processes a solution of relatively high concentration of the hygroscopic organic substance develops in the liquid adhered to the matted glass fiber walls 84. The average concentration of this adhered liquid, as measured by the liquid returning through the U-tube 105 is in the order of from 6% to 8% and without any substantial carry over of the hygroscopic organic substance to the discharge of the apparatus. In this connection, it must be appreciated that this 6%–8% solution is derived wholly from the minute particles of solution and such minute amount of hygroscopic organic substance in vapor form as escapes the reflux cooling coil 61. In the matted glass fiber walls 84 the adhered solution has a concentration gradient both horizontally and vertically. The horizontal gradient is due to substantially fresh water supplied as fog to the entering faces of these walls; to the horizontal force of the air and vapor in passing horizontally through the wall; and to the progressive enrichment resulting from the evaporation and condensation action within the wall. The vertical gradient is due to the downflow of the liquid adherent to the fibers of the matted glass fiber walls.

It is desirable to supply a minimum amount of water to the fogging nozzles 90 primarily because such water dilutes the solution being concentrated and hence reduces the efficiency of operation, but also because too great a quantity of water reduces the effective porosity of the matted glass fiber walls 84 and hence increases their resistance to air flow without increase in their efficiency in extraction of the organic hygroscopic material. This minimum adjustment of the supply of water to the fogging nozzles 90 is not particularly critical and can be satisfactorily adjusted by hand but for full automatic operation, the pressure drop across the matted glass fiber walls 84 can be used to adjust the supply of water to the fogging nozzles so as to keep the supply constant. Thus as the impedance of the matted glass fiber walls increases due to excessive water supply from the fogging nozzles 90, the pressure drop across these walls increases. This pressure drop impressed on opposite sides of the diaphragm in the diaphragm switch 95 opens this switch to deenergize the solenoid valve 100, this partially closing the valve to supply a reduced amount of water to the fogging nozzles 90 until the desired degree of wetness of the matted glass fiber walls 84 is restored.

While the invention has been particularly described in connection with the use of a stream of atmospheric air as the carrier gas and also has been described in connection with the use of compressed air in the chambers formed by the matted glass fiber cylinders 84, it is apparent that any other gas could be used instead of atmospheric air. Such use of even a comparatively costly gas other than air would not be impracticable since such other gas could be recycled from the outlets 26 to the inlet 20 of the apparatus, in which event the water vapor would be abstracted from the returned gas such as by passing it through a condensing coil. Since it is feasible to use gases other than air, except where so limited, the claims are not to be interpreted as limited to any particular gas.

It will also be seen that the invention is essentially directed to a concentrator for concentrating aqueous solutions of hygroscopic organic substances having boiling points higher than the normal boiling point of water without substantial loss of the substance and which includes a casing through which a stream of gas is adapted to be propelled, a concentrating spray nozzle in this casing and arranged to discharge as a spray a stream of solution into the stream of gas passing through the casing for evaporation from the spray projected into the stream of gas by the concentrating nozzle, a heater arranged to heat at least one of these streams to a temperature above the initial dewpoint temperature of the stream of gas so that the spray from the nozzle transfers by evaporation to the stream of gas mixed vapors of water and said organic substance and thereby concentrates, with respect to the organic substance, the portion of the spray not evaporating, together with means arranged substantially to saturate the stream of gas containing the mixed vapors with water thereby to drive the preponderance of vaporized hygroscopic content of the mixed vapors into liquid form, and means for recovering such minute particles of solution as are generated and become entrained in the stream of gas, together with a part of any hygroscopic organic substance remaining in the stream of gas in vapor form, and which comprises providing a chamber enclosed by a vertical wall of matted, closely spaced, hair-like fibers and having generally parallel vertical entering and leaving faces, the cross sectional area of this wall in any plane normal to its faces being very substantially less than the area of said faces, a conduit arranged to conduct the stream of gas leaving the saturating means into this chamber to escape horizontally through its matted fiber wall, and means at the base of the wall arranged to recover the liquid trapped by and flowing down the wall.

It will further be seen that the invention involves a novel method which includes filtering the horizontally moving stream of gas containing the hygroscopic organic substance in vapor and in the form of entrained minute particles of liquid and which desirably involves the addition, in advance of the filter, of both a fog and an additional stream of unsaturated gas to the stream being treated.

It will also be seen that the invention involves a very simple and positive mechanism for feeding the dilute liquid to the apparatus and returning the concentrated liquid therefrom.

I claim:

1. In a concentrator for concentrating aqueous solutions of hygroscopic organic substances having boiling points higher than the normal boiling point of water without substantial loss of the substance, and having a casing through which a stream of gas is adapted to be propelled, means arranged to contact an extended surface of a stream of said solution with the stream of gas passing through said casing for evaporation into said stream of gas, a heater arranged to heat at least one of said streams at or prior to said contact with the other stream to a temperature above the initial dewpoint temperature of said stream of gas whereby said stream of solution transfers by evaporation to said stream of gas mixed vapors of water and said organic substance and thereby concentrates, with respect to said organic substance, the portion of said stream of solution not evaporating, said contact means also generating minute particles of said solution in said stream of gas, the combination therewith of means for recovering said minute particles of solution entrained in the stream of gas leaving said contact means together with a part of any hygroscopic organic substance then remaining in said stream of gas in vapor form, comprising means providing a chamber enclosed by a vertical wall of matted, closely spaced, hair-like fibers and having generally parallel vertical entering and leaving faces, the cross sectional area of said wall in any plane normal to its said faces being very substantially less than the area of either of said faces, means arranged to conduct the stream of gas leaving said contact means into said chamber to escape horizontally through said wall, and means at the base of said wall arranged to recover the liquid trapped by and flowing down said wall.

2. A structure as set forth in claim 1 wherein said wall is made of matted hair-like glass fibers and wherein its thickness in a horizontal direction is in the order of one inch.

3. A structure as set forth in claim 1 wherein means are provided for conducting said gas leaving said contact means to the bottom of said chamber.

4. A structure as set forth in claim 1 wherein said wall is in the form of a vertical cylinder enclosing all vertical sides of said chamber.

5. A structure as set forth in claim 4 wherein said cylinder is encased by a cylindrical reticulated metal frame.

6. A structure as set forth in claim 1 wherein means are provided for wetting said wall with a separate stream of water containing not more than a small amount of said hygroscopic organic substance.

7. A structure as set forth in claim 1 including a fogging nozzle in said chamber and discharging water containing not more than a small fraction of said hygroscopic organic substance to impinge upon the face of said wall opposing said chamber.

8. A structure as set forth in claim 6 wherein means are provided for introducing a separate stream of unsaturated gas into said chamber.

9. A structure as set forth in claim 3 including a fogging nozzle in the top of said chamber and discharging water containing not more than a small fraction of said hygroscopic organic substance to impinge upon the face of said wall opposing said chamber.

10. A concentrator for concentrating aqueous solutions of hygroscopic organic substances having boiling points higher than the normal boiling point of water without substantial loss of the substance, which comprises a casing forming a sump in its bottom for a body of said solution, a vertical central partition in said casing and providing an upflow and a downflow pass connected at their lower ends, an air inlet arranged to admit atmospheric air to the upper end of said downflow pass, a heating coil in said downflow pass, a pump arranged to withdraw solution from said sump, a concentrating spray nozzle in said downflow pass and connected to the outlet of said pump to discharge a spray of said solution to impinge against said heating coil, means arranged to supply a heating medium to said heater to maintain said body of solution at a temperature above the initial dewpoint temperature of said air whereby the spray from said nozzle transfers by evaporation to said air mixed vapors of said water and organic substance and thereby concentrates, with respect to said substance, the portion of said spray not evaporating and returning by gravity to said body, said spray and heating coil also generating minute particles of said solution in said stream of gas, means arranged in said upflow pass substantially to saturate the air containing said mixed vapors with water thereby to drive the preponderance of the vaporized hygroscopic organic substance into liquid form, a blower having its inlet communicating with the upper end of said upflow pass to provide air movement from said air inlet, down said downflow pass, up said upflow pass and out of said casing, and means for recovering the minute particles of solution entrained in the stream of air leaving said saturating means together with a part of any hygroscopic organic substance remaining in said air in vapor form, comprising a generally horizontal partition across the upper end of said upflow pass and having an opening therein, a vertical wall of matted, closely spaced, hair-like fibers enclosing a chamber above said generally horizontal partition and with its interior in communication with said opening in said generally horizontal partition, the air entering said chamber escaping through the interstices of said wall, and means arranged at the base of said wall to recover the liquid trapped by and flowing down said wall.

11. A structure as set forth in claim 10 wherein said wall is in the form of a vertical cylinder mounted on said generally horizontal partition and closed at its top.

12. In combination with a concentrator containing a body of liquid subjected to evaporation, apparatus for feeding dilute liquid to said body and removing concentrated liquid therefrom, comprising a supply pipe arranged to discharge into said body, a supply pump arranged to move said dilute liquid through said supply pipe into said body, a return line having its inlet communicating with said body and arranged to withdraw concentrated liquid therefrom, a return pump arranged to move said concentrated liquid through said return line, a branch in said return line on the discharge side of said return pump and arranged to discharge liquid back into said body, a valve in said branch, and a means responsive to the level of said body and arranged to open and close said valve, said return pump being of higher capacity than said supply pump.

13. A structure as set forth in claim 12 wherein a manual adjusting valve is provided in said supply line.

References Cited in the file of this patent

UNITED STATES PATENTS

| | | |
|---|---|---|
| 235,521 | Fox | Dec. 14, 1880 |
| 478,458 | Petterson et al. | July 5, 1892 |
| 651,826 | Coleman | June 19, 1900 |
| 984,822 | Lillie | Feb. 21, 1911 |
| 1,172,429 | Carrier | Feb. 22, 1916 |
| 1,686,475 | Southgate | Oct. 2, 1928 |
| 1,780,977 | Leslie et al. | Nov. 11, 1930 |
| 2,022,740 | Rowell | Dec. 3, 1935 |
| 2,224,986 | Potts et al. | Dec. 17, 1940 |
| 2,367,695 | Spiselman | Jan. 23, 1945 |